(12) United States Patent
Shiiba (10) Patent No.: US 7,686,112 B2
(45) Date of Patent: Mar. 30, 2010

(54) APPARATUS AND METHOD FOR CONTROLLING HYBRID VEHICLE

(75) Inventor: Hidenori Shiiba, Sagamihara (JP)

(73) Assignee: Nissan Motor Co., Ltd., Yokohama-shi, Kanagawa (JP)

( * ) Notice: Subject to any disclaimer, the term of this patent is extended or adjusted under 35 U.S.C. 154(b) by 348 days.

(21) Appl. No.: 11/753,662

(22) Filed: May 25, 2007

(65) Prior Publication Data

US 2007/0272456 A1 Nov. 29, 2007

(30) Foreign Application Priority Data

May 29, 2006 (JP) .............................. 2006-147584
Apr. 4, 2007 (JP) .............................. 2007-097961

(51) Int. Cl.
*B60W 10/02* (2006.01)
(52) U.S. Cl. .............................. 180/65.275; 180/65.21; 180/65.265; 192/82 T; 477/5; 477/98
(58) Field of Classification Search .............. 180/65.21, 180/65.22, 65.25, 65.265, 65.275, 65.6, 65.7; 192/82 T, 103 R; 477/5, 6, 98
See application file for complete search history.

(56) References Cited

U.S. PATENT DOCUMENTS

| 4,425,992 | A | * | 1/1984 | Makita ..................... 192/82 T |
|---|---|---|---|---|
| 5,359,308 | A | * | 10/1994 | Sun et al. ..................... 335/216 |
| 5,713,814 | A | * | 2/1998 | Hara et al. ..................... 477/5 |
| 5,823,912 | A | * | 10/1998 | Fischer et al. .................. 477/97 |
| 5,833,570 | A | | 11/1998 | Tabata et al. |
| 5,997,433 | A | * | 12/1999 | Domian et al. ................. 477/98 |
| 6,808,470 | B2 | * | 10/2004 | Boll ............................. 477/6 |
| 7,029,413 | B2 | * | 4/2006 | Sugawara et al. ........... 475/117 |
| 2005/0090370 | A1 | | 4/2005 | Berger et al. |

FOREIGN PATENT DOCUMENTS

| DE | 102 04 982 A1 | 8/2003 |
|---|---|---|
| DE | 103 16 422 A1 | 12/2003 |
| EP | 1 209 017 A2 | 5/2002 |
| JP | H11-082260 | 3/1999 |
| JP | 2000-255285 | 9/2000 |
| JP | 2003-212003 | 7/2003 |
| JP | 2005-221073 | 8/2005 |
| WO | 03/074894 A2 | 9/2003 |

* cited by examiner

*Primary Examiner*—Paul N Dickson
*Assistant Examiner*—Bryan A Evans
(74) *Attorney, Agent, or Firm*—Young Basile

(57) ABSTRACT

An apparatus for controlling a hybrid vehicle including a first coupling element disposed between an engine and a motor-generator, a second coupling element disposed between the motor-generator and driving wheels of the hybrid vehicle, a sensor for sensing temperatures of the first coupling element and/or the second coupling element and a controller. The controller controls an amount of slippage in either the first coupling element, the second coupling element, or both, depending on the sensed temperatures.

19 Claims, 5 Drawing Sheets

APPARATUS AND METHOD FOR CONTROLLING HYBRID VEHICLE

CROSS-REFERENCE TO RELATED APPLICATION

This application claims priority for Japanese Patent Application Number 2006-147584, filed on May 29, 2006, which is incorporated herein in its entirety by reference, and claims priority to Japanese Patent Application Number 2007-097961, filed Apr. 4, 2007.

TECHNICAL FIELD

The present invention relates to an apparatus for controlling hybrid vehicles having both a engine and a motor-generator as a drive power source.

BACKGROUND

Japanese Patent Provisional Publication No. 2005-221073 discloses a conventional hybrid vehicle. The hybrid vehicle includes a first coupling element that disconnects and connects a power transmission route between the engine and the motor-generator and a second coupling element that disconnects and connects a power transmission route between the motor-generator and driving wheels. The hybrid vehicle has a motor-using drive mode in which the hybrid vehicle is driven by the power source including only the motor-generator, and an engine-using drive mode in which the hybrid vehicle is driven by the power source that includes the engine. Fuel economy is improved in the hybrid vehicle by shifting the drive mode between the motor-using drive mode and the engine-using drive mode depending on the drive condition. The technology as described in that publication contemplates reducing shock by conducting slip-control of the second coupling element at the engine start upon changeover from the motor-using drive mode to the engine-using drive mode.

SUMMARY

Embodiments of an apparatus for controlling a hybrid vehicle are taught herein. One example of an apparatus for controlling a hybrid vehicle comprises an engine, a motor-generator, a first coupling element disposed between the engine and the motor-generator to disconnect and connect a power transmission route between the engine and the motor-generator, a second coupling element disposed between the motor-generator and driving wheels of the hybrid vehicle to connect and disconnect a power transmission route between the motor-generator and the driving wheels, a sensor device operable to sensing a temperature of at least one of the first coupling element and the second coupling element and a controller. The controller is configured to control an amount of slippage in at least one of the first coupling element and the second coupling element depending on the temperature.

Another example of an apparatus for controlling a hybrid vehicle is taught herein wherein the hybrid vehicle comprises an engine, a motor-generator, first coupling means for connecting and disconnecting a power transmission route between the engine and the motor-generator and second coupling means for connecting and disconnecting a power transmission route between the motor-generator and driving wheels. The apparatus comprises means for sensing a temperature of at least one of the first coupling means and the second coupling means and means for controlling the amount of slippage in at least one of the first and second coupling means depending on the temperature.

Methods of controlling a hybrid vehicle are also taught herein. The hybrid vehicle includes an engine, a motor-generator, a first coupling element disposed between the engine and the motor-generator and a second coupling element disposed between the motor-generator and a driving wheel. According to one embodiment, the method comprises controlling an amount of slippage in at least one of the first coupling element and the second coupling element depending on a temperature of at least one of the first coupling element and the second coupling element.

BRIEF DESCRIPTION OF THE DRAWINGS

The description herein makes reference to the accompanying drawing wherein like reference numerals refer to like parts throughout the several views, and wherein.

DETAILED DESCRIPTION OF EMBODIMENTS OF THE INVENTION

For devices and methods for controlling a hybrid vehicle as described in Japanese Patent Provisional Publication No. 2005-221073, if the slip control of the coupling element is overheated, the coupling element will be further overheated and thereby deteriorate the durability thereof.

In contrast, according to embodiments of the invention control of the amount of slippage in the first and second coupling elements depends on the temperatures of at least one of the first and second coupling elements. Accordingly, it is possible to suppress the occurrence of overload and overheat in the clutches and thereby improve durability of the clutches.

Figure 1:
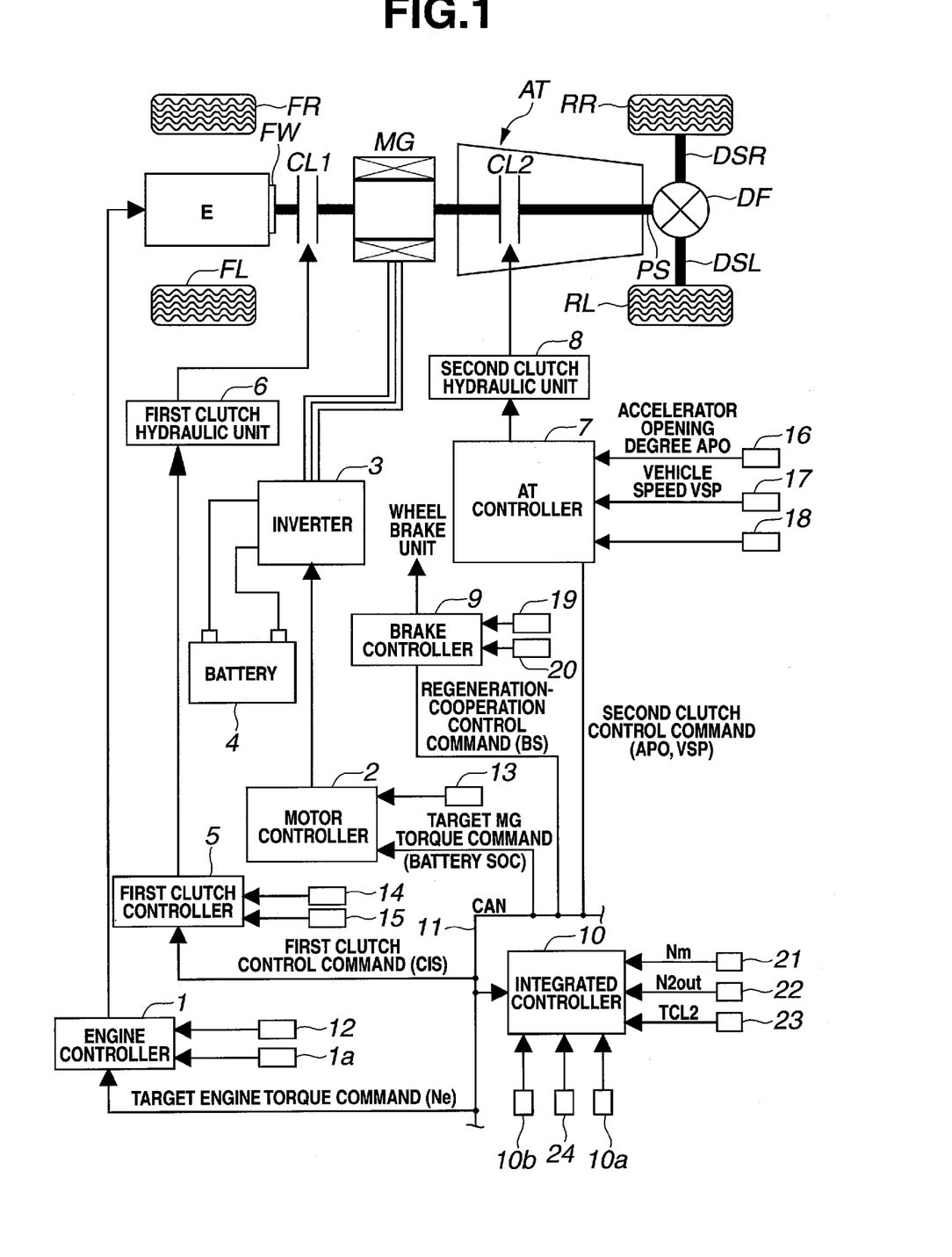
FIG. 1 is a general system diagram showing a rear-wheel-drive hybrid vehicle to which mode transition control for an overheat state according to a first embodiment of the invention is applied.

FIG. 1 illustrates a general system diagram showing a rear-wheel-drive hybrid vehicle to which mode transition control for an overheat state according to a first embodiment of the invention is applied. As illustrated in FIG. 1, the drive system of the first embodiment includes engine E, flywheel FW, first clutch CL1, motor-generator MG, second clutch CL2, automatic transmission AT, propeller shaft PS, a differential DF, left drive shaft DSL, right drive shaft DSR, left rear-wheel RL (driving wheel) and right rear-wheel RL (driving wheel). Reference signs FL and FR denote left front-wheel and right front-wheel, respectively.

Engine E may be a gasoline engine or a diesel engine. Engine E is controlled based on a control command transmitted from the engine controller 1 as explained later. The control command includes, for instance, a command for controlling an opening degree of a throttle valve. Flywheel FW is provided on an output shaft of the engine E.

First clutch CL1 is disposed between the engine E and the motor-generator MG. First clutch CL1 is controlled by a control fluid pressure to shift between an engaged state and a disengaged state (released state). The engaged state and the disengaged state include a slip-engaged state and a slip-disengaged state, respectively. The control fluid pressure is produced by the first clutch hydraulic unit 6 based on a control command transmitted from the first clutch controller 5 as explained later.

Motor-generator MG is a synchronous the motor-generator that includes a rotor having permanent magnet embedded in the rotor and a stator having stator winding wound on the stator. Motor-generator MG is controlled by applying a three-phase alternating current produced by inverter 3 based on a control command from motor controller 2. Motor-generator MG can act as a motor rotatively driven by electric power supplied from battery 4, This action as the motor is hereinafter referred to as "power running". Motor-generator MG can also act as a generator that produces electromotive force at both ends of the stator winding and charges battery 4 when the rotor is rotated by an external force. This action as the generator is hereinafter referred to as "regeneration". The rotor of the motor-generator MG is connected with an input shaft of automatic transmission AT through a damper, not shown.

Second clutch CL2 is disposed between the motor-generator MG and the left and right rear-wheels RL and RR. Second clutch CL2 is controlled by a control fluid pressure to shift between an engaged state and a disengaged state (released state). The engaged state and the disengaged state include a slip-engaged state and a slip-disengaged state, respectively. The control fluid pressure is produced by the second clutch hydraulic unit 8 based on a control command transmitted from AT controller 7 as explained later.

Automatic transmission AT has gear stages including five forward speeds and one reverse. A stepwise gear ratio of automatic transmission AT is automatically changed depending on the vehicle speed, accelerator opening degree, and the like. Second clutch CL2 is not a special-purpose clutch newly added but is constituted of some of the frictionally-engaging elements already disposed in the automatic transmission AT to engage at the respective gear stages of the automatic transmission AT. Second clutch CL2 will be explained in more detail later.

An output shaft of the automatic transmission AT is connected with left and right rear-wheels RL and RR through propeller shaft PS, the differential DF, the left drive shaft DSL and the right drive shaft DSR. Each of the first clutch CL1 and the second clutch CL2 is a wet multiple disk clutch that can continuously control fluid flow and fluid pressure, for instance, by means of a proportional solenoid.

This drive system of the hybrid vehicle includes three drive modes determined depending on the engaged state and the disengaged state of the first clutch CL1. The first drive mode is a motor-drive mode, namely, an electric drive mode, hereinafter referred to as EV mode, in which the first clutch CL1 is in the disengaged state and the hybrid vehicle is driven by only the power of the motor-generator MG as a power source. The second drive mode is an engine-drive mode, hereinafter referred to as HEV mode, in which the first clutch CL1 is in the engaged state and the hybrid vehicle is driven by the power source that includes the engine E. The third drive mode is the engine-slip drive mode, hereinafter referred to as WSC (Wet Start Clutch) mode, in which the first clutch CL1 is in the engaged state, the second clutch CL2 is in the slip-controlled state, and the hybrid vehicle is driven by the power source that includes the engine E. In WSC mode, creep drive of the hybrid vehicle can be achieved when the state of charge of the battery (SOC) is low or the engine cooling water temperature is low. WSC mode includes a plurality of drive modes as explained in detail later.

HEV mode as described above includes three drive modes, namely, the engine drive mode, a motor-assist drive mode and a driving power generation mode. In the engine drive mode, the driving wheels are driven only by the engine E as the power source. In the motor-assist drive mode, the driving wheels are driven by the engine E and the motor-generator MG as the power source. In the driving power generation mode, the driving wheels RR and RL are driven by the engine E as the power source, and the motor-generator MG is operated as a generator.

During constant speed driving and acceleration driving, the motor-generator MG is operated as a generator by using the power of the engine E. During deceleration driving, the motor-generator MG is operated as a generator so as to charge battery 4 by regenerating braking energy.

The drive system of the hybrid vehicle further includes a power generation mode in which the motor-generator MG is operated as a generator by using the power of the engine E when the hybrid vehicle is stopped.

Next, a control system of the hybrid vehicle according to the first embodiment is explained. As illustrated in FIG. 1, the control system of the hybrid vehicle includes the engine controller 1, a motor controller 2, an inverter 3, a battery 4, a first clutch controller 5, a first clutch hydraulic unit 6, an AT controller 7, the second clutch hydraulic unit 8, a brake controller 9 and an integrated controller 10. The engine controller 1, the motor controller 2, the first clutch controller 5, the AT controller 7, the brake controller 9 and the integrated controller 10 are interconnected via a CAN communication line 11 through which information interchange therebetween can be performed.

Each controller described herein, including the integrated controller 10, generally consists of a microcomputer including central processing unit (CPU), input and output ports (I/O) receiving certain data described herein, random access memory (RAM), keep alive memory (KAM), a common data bus and read only memory (ROM) as an electronic storage medium for executable programs and certain stored values as discussed hereinafter. The functions of the integrated controller 10 described herein could be, for example, implemented in software as the executable programs, or could be implemented in whole or in part by separate hardware in the form of one or more integrated circuits (IC). Also, although the integrated controller 20 is shown as a separate device from the other controllers, the controllers can be implemented by fewer devices, including a common device.

Engine controller 1 receives engine water temperature information from an engine water sensor 1a and engine speed information from an engine speed sensor 12. Engine controller 1 outputs a control command to control the engine operating points (Ne, Te) in response to a command such as a target engine torque transmitted from the integrated controller 10. The control command is output to, for instance, a throttle valve actuator, not shown. The engine speed Ne information is supplied to the integrated controller 10 via CAN communication line 11.

Motor controller 2 receives information from a resolver 13 that detects a rotational position of the rotor of the motor-generator MG. Motor controller 2 outputs a control command to control motor operating points (Nm, Tm) of the motor-generator MG to the inverter 3 in response to a target motor-generator torque command transmitted from the integrated controller 10. Motor controller 2 monitors the battery SOC indicative of the state of charge of battery 4. The battery SOC information is used for controlling the motor-generator MG and is supplied to the integrated controller 10 via CAN communication line 11.

First clutch controller 5 receives sensor information from a first clutch hydraulic sensor 14 and a first clutch stroke sensor 15. First clutch controller 5 outputs a control command for engagement and disengagement of the first clutch CL1 to the first clutch hydraulic unit 6 in response to a first clutch control command transmitted from integrated controller 10. The information concerning the first clutch stroke C1S is supplied to the integrated controller 10 via the CAN communication line 11.

AT controller 7 receives sensor information from an accelerator opening degree sensor 16, a vehicle speed sensor 17 and a second clutch hydraulic sensor 18. AT controller 7 outputs a control command for engagement and disengagement of the second clutch CL2 to the second clutch hydraulic unit 8 within an AT hydraulic control valve in response to a second clutch control command transmitted from the integrated controller 10. The information concerning an accelerator pedal opening degree APO and a vehicle speed VSP is supplied to the integrated controller 10 via CAN communication line 11.

Brake controller 9 receives sensor information from a wheel speed sensor 19 that senses a speed of each of the four wheels and a brake stroke sensor 20. Brake controller 9 conducts brake control based on a control command transmitted from integrated controller 10. For instance, in a case where a brake pedal is depressed and the required braking force determined by brake stroke BS cannot be obtained by only a regenerative braking force, the brake controller 9 executes regeneration-cooperation brake control for compensating for the lack of the required braking force by a mechanical braking force such as hydraulic braking force and motor braking force based on a regeneration-cooperation control command from the integrated controller 10.

Integrated controller 10 acts to control energy consumption of the hybrid vehicle as a whole and drive the hybrid vehicle with the highest degree of efficiency. Integrated controller 10 receives information transmitted from a motor speed sensor 21, a second clutch output speed sensor 22, a second clutch torque sensor 23, a brake fluid pressure sensor 24, a first clutch temperature sensor 10a and a second clutch temperature sensor 10b in addition to the information transmitted via the CAN communication line 11. Motor speed sensor 21 senses the motor rotating speed Nm. Second clutch output speed sensor 22 senses the output rotating speed N2 out of the second clutch CL2. Second clutch torque sensor 23 senses the torque TCL2 of the second clutch CL2. First clutch temperature sensor 10a senses a temperature of the first clutch CL1. Second clutch temperature sensor 10b senses a temperature of the second clutch CL2.

Temperature sensors 10a and 10b are not limited to specific ones and may be constructed so as to estimate and compute an amount of heat that is generated in the respective clutches based on an amount of slippage in the respective clutches, that is, a difference in rotating speed between the drive side and the driven side, and the coupling capacity of the clutches.

Integrated controller 10 controls the operation of the engine E by outputting the control command to the engine controller 1, the operation of the motor-generator MG by outputting the control command to motor controller 2, the engagement and disengagement of the first clutch CL1 by outputting the control command to the first clutch controller 5, and the engagement and disengagement of the second clutch CL2 by outputting the control command to the AT controller 7.

Further, integrated controller 10 monitors the temperatures of the respective clutches CL1 and CL2 sensed by temperature sensors 10a and 10b, respectively, and determines whether the sensed temperatures are greater than or equal to preset temperatures (Tm1 and Tm2 as described later) that are indicative of an abnormal temperature. Integrated controller 10 executes the mode transition control for overheat state so as to prevent the clutches CL1 and CL2 from overheating depending on the sensed temperatures. This mode transition control for the overheat state is explained later.

Figure 2:
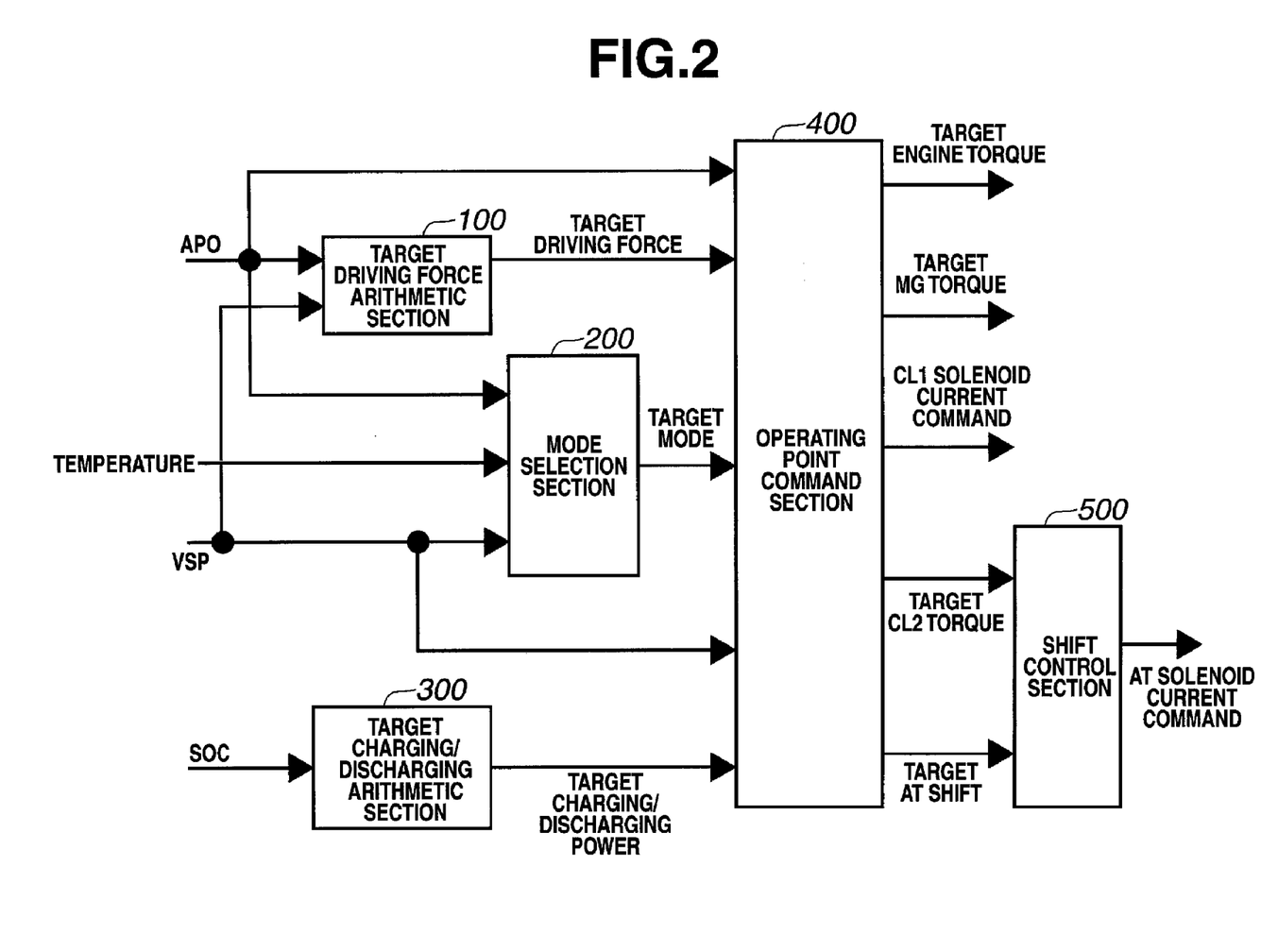
FIG. 2 is a control block diagram showing an arithmetic operation program of an integrated controller of the first embodiment of the invention.

Referring to FIG. 2, control executed by the integrated controller 10 of the first embodiment is explained. For instance, this control is executed by the integrated controller 10 at intervals of 10 msec. Integrated controller 10 includes a target driving force arithmetic section 100, a mode selection section 200, a target charging/discharging arithmetic section 300, an operating point command section 400 and a shift control section 500.

Figure 3:
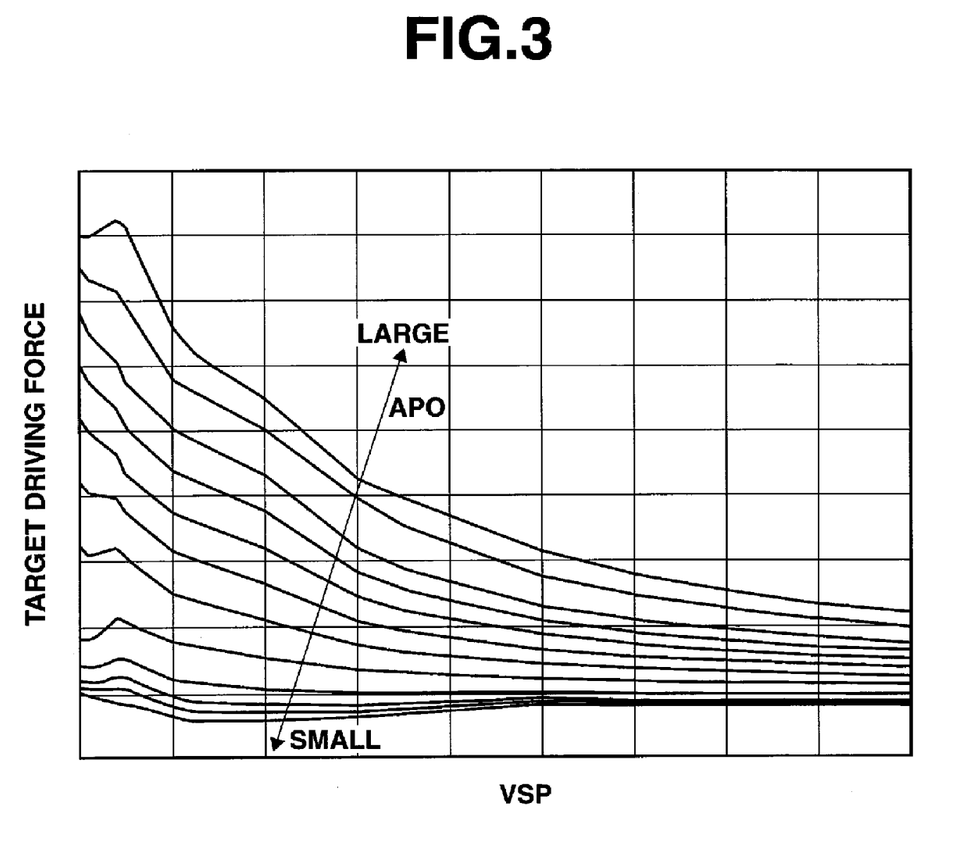
FIG. 3 is a graph showing an example of a target driving force map used for calculating the target driving force by a target driving force arithmetic section shown in FIG. 2.

Target driving force arithmetic section 100 computes the target driving force tFo0 based on the accelerator pedal opening degree APO and the vehicle speed VSP by using a target driving force map such as that shown in FIG. 3.

Figure 4:
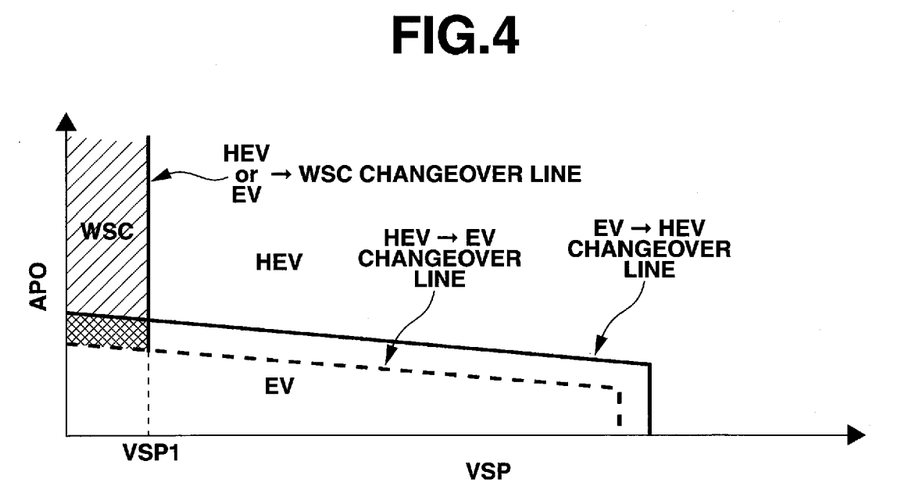
FIG. 4 is a graph showing an EV-HEV selection map used for selection of the target mode by a mode selection section shown in FIG. 2.

Mode selection section 200 performs an operation of a target mode based on the accelerator pedal opening degree APO and the vehicle speed VSP by using an EV-HEV selection map such as that shown in FIG. 4. Here, if the battery SOC is a predetermined value or less, the HEV mode will be inevitably set as the target mode. In the EV-HEV selection map, the WSC mode is set in order to output a large driving force under conditions where the accelerator pedal opening degree APO is large in a low vehicle-speed range. Further, HEV→WSC changeover line or EV→WSC changeover line is drawn through point VSP1 of the vehicle speed VSP. Point VSP1 is smaller than the idle speed of the engine E when the first speed of the gear stage of automatic transmission AT is selected. In FIG. 4, a hatched area denotes a range in which the HEV mode is shifted to the WSC mode, and a double-hatched area denotes a range in which the WSC mode is shifted to the EV mode.

Figure 5:
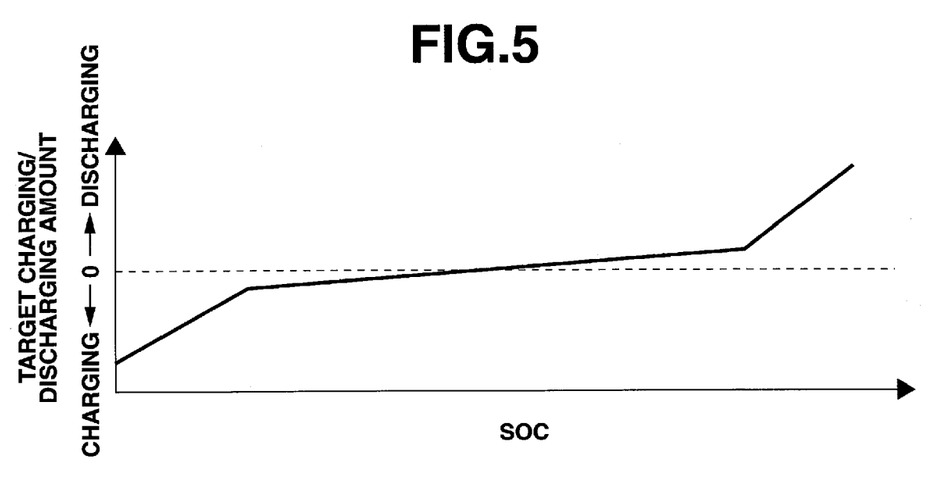
FIG. 5 is a graph showing an example of a target charging/discharging amount map used for the calculation of target charging/discharging power by a target charging/discharging arithmetic section shown in FIG. 2.

Target charging/discharging arithmetic section 300 computes the target charging/discharging power tP based on the battery SOC by using a target charging/discharging amount map such as that shown in FIG. 5.

Operating point command section 400 computes a transient target engine torque, a target motor-generator torque, a target second clutch coupling capacity, a target AT shift and the first clutch solenoid current command signal based on the accelerator pedal opening degree APO, the target driving force tFo0, the target mode, vehicle speed VSP and target charging/discharging power tP. Operating point command section 400 includes an engine start-up control section that starts the engine E upon transition from the EV mode to the HEV mode.

Now engine start-up control is explained. When a request for engine start-up is made, the coupling capacity of the second clutch CL2 is set to a value that corresponds to an output shaft torque before the engine start-up, and the driving force of motor-generator MG is increased. The load exerted on the motor-generator MG is only the coupling capacity of a second clutch CL2, and therefore the motor-generator MG undergoes an excessive driving force so that the rotating speed of the motor-generator MG is increased. The TM output torque is determined by the coupling capacity of a second clutch CL2, whereby fluctuations in the TM output torque do not occur.

At this time, the engine start-up request is made, and the coupling capacity of the first clutch CL1 is increased to a predetermined value at the time at which it is expected that the driving force of the motor-generator MG is sufficiently increased, for example, when the rotating speed of the motor-generator MG becomes larger by a predetermined value or more than the TM rotating speed. The coupling capacity of the first clutch CL1 is thus increased such that the engine E can be quickly started.

When the coupling capacity of the first clutch CL1 is increased up to the predetermined value, the load that is exerted on the motor-generator MG becomes larger. In addition, as the coupling capacity of the first clutch CL1 is increased, the torque of the motor-generator MG becomes large. In this state, the coupling capacity of the first clutch CL1 is increased up to the value that corresponds to the torque that is substantially required for the engine start-up. Cranking of the engine E is performed to thereby cause self-rotation of the engine E. Engine start-up is thus completed. That is, under engine start-up control a second clutch CL2 is kept in a slip state so as to minimize the TM output torque fluctuation.

Shift control section 500 controls a solenoid valve within the automatic transmission AT so as to achieve the coupling capacity of each of the respective clutches and a target gear stage in accordance with a preset shift schedule. The shift schedule includes the target gear stage that is preset based on the vehicle speed VSP and accelerator pedal opening degree APO. In the shift schedule, there are an up-shift line, a down-shift line, and the like.

Figure 6:
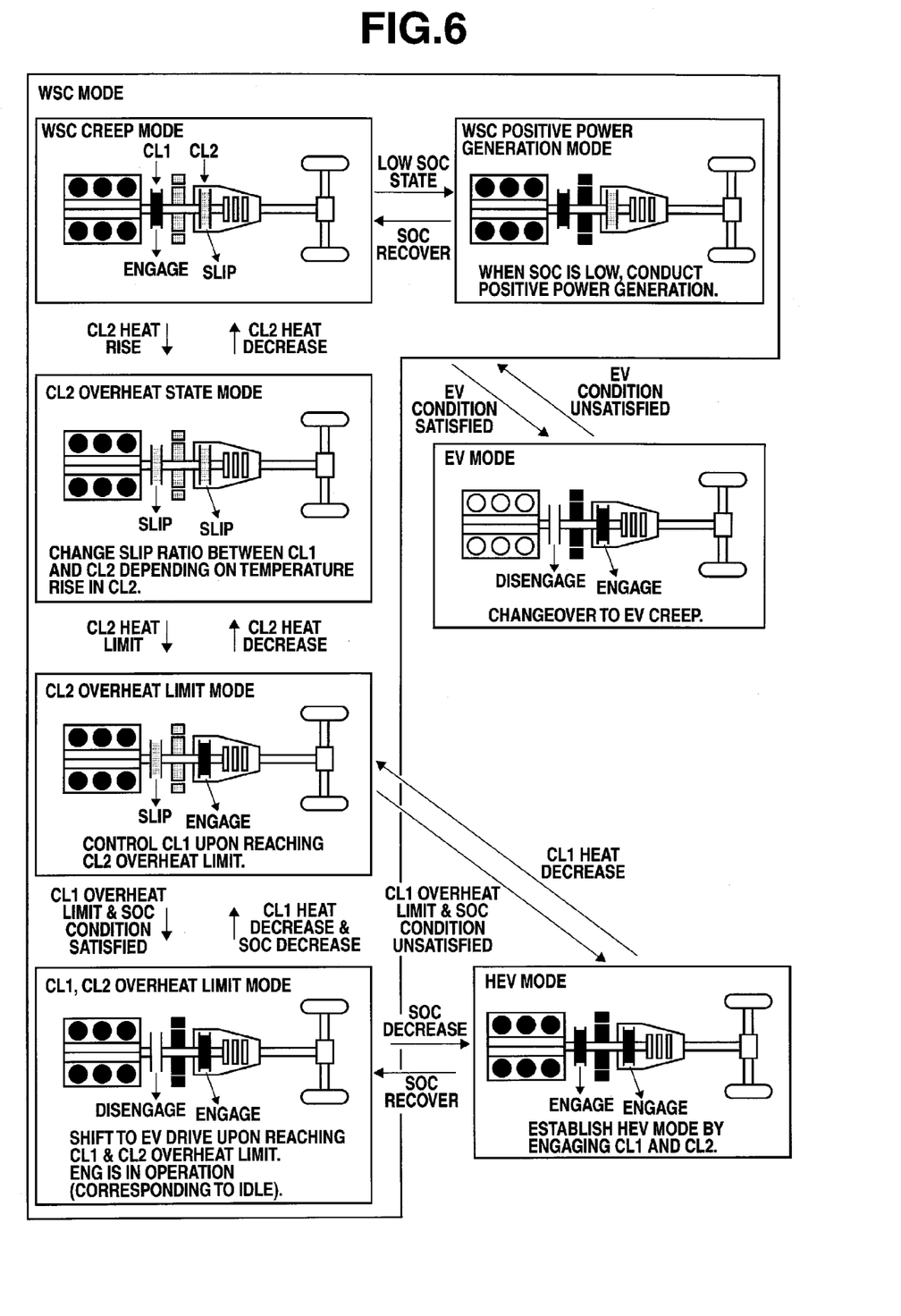
FIG. 6 is a mode transition diagram showing modes (including an EV mode and a HEV mode) of WSC mode according to the first embodiment.

Next, the WSC mode is explained in detail. FIG. 6 is a mode transition diagram showing plural drive modes (including the EV mode and the HEV mode) in the WSC mode. The WSC mode includes a WSC creep mode, a CL2 overheat state mode, a CL2 overheat limit mode, a CL1 & CL2 overheat limit mode and a WSC positive power generation mode. A feature of the WSC mode resides in that the engine E is kept in operation, and a response to variation in the required driving force is quick. The modes of the WSC mode are explained hereinafter.

WSC creep mode is a mode in which the first clutch CL1 is in a completely engaged state, the second clutch CL2 is in a slip-control state, and the creep drive of the hybrid vehicle is conducted using the driving force of the engine E. Here, creep drive denotes a driving state in which a predetermined torque is produced in the driving wheels as observed in the vehicle equipped with a torque converter even when accelerator pedal opening degree APO is set to 0 by the vehicle driver.

That is, since there is no element such as a torque converter that absorbs the rotating speed of the engine E, the vehicle speed is determined depending on the rotating speed of the engine E when the first clutch CL1 and the second clutch CL2 are completely engaged. Engine E has a lower limit value of idle speed that is set in order to maintain the self-rotation. While idle-up such as warm-up operation of the engine E is conducted, the lower limit value of idle speed becomes large. Therefore, in order to generate a stable creep torque by the engine E even in this condition, the second clutch CL2 is allowed to be in the slip-control state, and the creep drive using the engine E is achieved at the vehicle start and during extremely low speed driving in which the vehicle speed is below the lower limit value of the idle speed. In the WSC creep mode, the driving force of the motor-generator MG may be used.

CL2 overheat state mode is a mode in which the first clutch CL1 is in a slip-control state, the second clutch CL2 is in a slip-control state, and creep drive of the hybrid vehicle is conducted using the driving force of the engine E. CL2 overheat state mode is performed in the creep drive but may be performed so as to apply a desired torque to the driving wheels in an ordinary drive mode in which the accelerator pedal is depressed. In the CL2 overheat state mode, the driving force of the motor-generator MG may be used.

For instance, when the temperature of the second clutch CL2 becomes greater than or equal to predetermined value Tm1 lower than an overheat limit value of the second clutch CL2, and the second clutch CL2 is kept in this temperature condition in the WSC creep mode, it is likely that the temperature of the second clutch CL2 reaches the overheat limit value at a relatively early stage. In this case, a load that is exerted on the second clutch CL2 can be reduced by suitably changing a relationship between an amount of slippage in the first clutch CL1 in the slip-control state and an amount of slippage in the second clutch CL2 in the slip-control state depending on the temperature of each of the clutches CL1 and CL2.

The desired torque that is applied to the driving wheels is determined based on the required driving force, whereby a lower limit value of the coupling capacity of a second clutch CL2 is set to a specific value. In this condition, when the coupling capacity of the second clutch CL2 is set to a certain value, the amount of slippage in the second clutch CL2 is determined based on the rotating speed of the motor-generator MG. When the rotating speed on the drive side of the second clutch CL2 is considerably larger than the rotating speed on the driving-wheel side of the second clutch CL2, the amount of slippage in the second clutch CL2 and an amount of heat that is generated in the second clutch CL2 are increased.

It can be understood from the above discussion that the rotating speed on the drive side of the second clutch CL2 must be decreased in order to reduce the amount of slippage in a second clutch CL2 under the condition that the coupling capacity of the second clutch CL2 is constant.

Accordingly, the amount of slippage in the second clutch CL2 is reduced by controlling the rotating speed of the motor-generator MG and decreasing the rotating speed on the drive side of the second clutch CL2.

This mode is effective under the condition that the heat generated in the first clutch CL1 is lower than the heat generated in a second clutch CL2.

CL2 overheat limit mode is a mode in which the first clutch CL1 is slip-controlled, the second clutch CL2 is completely engaged, and the creep drive of the hybrid vehicle is conducted using the driving force of the engine E. CL2 overheat limit mode is performed in the creep drive but may be performed so as to apply a desired torque to the driving wheels in an ordinary drive mode in which the accelerator pedal is depressed. In the CL2 overheat limit mode, the driving force of the motor-generator MG may be used.

For instance, when the temperature of the second clutch CL2 becomes greater than or equal to predetermined value Tm2 (>Tm1) that is the overheat limit value of the second clutch CL2, and the second clutch CL2 is kept in this temperature condition in the CL2 overheat state mode, it is likely that seizure occurs in the second clutch CL2. In this case, the amount of slippage in a second clutch CL2 can be decreased to 0 by completely engaging the second clutch CL2. No slippage is caused in the second clutch CL2, so the second clutch CL2 can be prevented from being further overheated. At this time, the coupling capacity of the first clutch CL1 is set to a value corresponding to the creep torque to thereby achieve stable creep drive of the hybrid vehicle even when the rotating speed of the engine E is varied.

This mode is effective under the condition that the first clutch CL1 is in a relatively less overheated state and the second clutch CL2 is overheated to the limit. In such a case, since the amount of slippage in a second clutch CL2 is 0, the amount of slippage in the first clutch CL1 becomes large.

CL1, CL2 overheat limit mode is a mode in which the first clutch CL1 is in a disengaged state, the second clutch CL2 is in a completely engaged state, and the hybrid vehicle is driven using only the driving force of the motor-generator MG. CL1, CL2 overheat limit mode differs from the ordinary EV mode in that idle speed is maintained without stopping the engine E.

For instance, when the temperature of the first clutch CL1 exceeds predetermined value Tm2 that is the overheat limit value, and the first clutch CL1 is further heated in the CL2 overheat limit mode, it is likely that seizure occurs in the first clutch CL1. In this case, the first clutch CL1 can be prevented from undergoing heating that is generated due to slippage by disengaging the first clutch CL1. Thus, the first clutch CL1 can be prevented from being further overheated. In this state, the engine E is kept in operation.

CL1, CL2 overheat limit mode is effective under the condition that the battery SOC is lowered, and a request for power generation is made. Since the operation of the engine E is kept in this mode, vehicle driving using the engine E can be performed by controlling only the coupling capacity of the first clutch CL1 without conducting the engine start control and the like, even in a case where the battery SOC is lowered. Further, it is possible to avoid overheat that is caused due to slip control of the second clutch CL2 at the engine start-up, deterioration in response, the engine start shock and the like. Further, in a case where the battery SOC is sufficiently obtained but the engine water temperature sensed by the engine water temperature sensor 1a is low, it is likely that combustion efficiency and smooth restart of the engine E cannot be improved. Therefore, in the case where the engine water temperature is low, it is effective to maintain the engine operation in the CL1, CL2 overheat limit mode.

In a case where the first clutch CL1 is a hydraulic multiple disk clutch, lubricating oil in the first clutch CL1 flows between the respective disk plates upon disengaging the first clutch CL1 so that cooling efficiency of the first clutch CL1 can be enhanced to thereby quickly decrease the temperature of the first clutch CL1.

WSC positive power generation mode is a mode in which the first clutch CL1 is in a completely engaged state, the second clutch CL2 is in a slip-control state, the hybrid vehicle is driven using only the driving force of the engine E, and the motor-generator MG acts as a generator by using the driving force of the engine E.

For instance, when the hybrid vehicle is driven using the driving force of the engine E and the driving force of the motor-generator MG in the WSC creep mode, the battery SOC is lowered due to power consumption by the motor-generator MG. In this case, the driving state of the hybrid vehicle can be kept and the battery SOC can be recovered by increasing the driving force of the engine E and allowing the motor-generator MG to generate electric power while keeping the coupling capacity of the second clutch CL1.

This mode is effective under the condition that the battery SOC is lowered. Further, it is possible to reduce feelings of dissatisfaction or the like of the vehicle driver that can be caused upon making transition from the mode such as the WSC creep mode in which a large driving force is not required.

Next, mode transition control for an overheat state in the WSC mode is explained. FIG. 6 includes a mode transition diagram showing mode transition from one of the drive modes in the WSC mode to another thereof.

Discussed first is the transition from WSC creep mode. When the battery SOC is lowered in the WSC creep mode, it is necessary to generate electric power by the motor-generator MG. In this case, preceding the transition to a second clutch CL2 or the first clutch CL1 overheat state mode as described later, transition from the WSC creep mode to the WSC positive power generation mode is carried out to thereby recover the battery SOC. Specifically, the transition from the WSC creep mode to the WSC positive power generation mode is performed by increasing the driving force of the engine E and switching the motor-generator MG from the driving state to the power generating state. When the battery SOC is recovered in the WSC positive power generation mode, transition to the WSC creep mode is conducted.

When the drive condition of the EV mode is satisfied in the WSC creep mode, transition from the WSC creep mode to the EV mode is conducted. Specifically, the transition from the WSC creep mode to the EV mode is performed by disengaging the first clutch CL1 and completely engaging a second clutch CL2. As a result, the second clutch CL2 can be prevented from undergoing slippage, and further heat generation can be avoided.

When the drive condition of the EV mode becomes unsatisfied in the EV mode, transition from the EV mode to the WSC creep mode is conducted. A decision on whether the drive condition of the EV mode is satisfied or not is made based on an EV-HEV selection map such as that described previously in FIG. 4. The decision on whether the drive condition of the EV mode is satisfied or not is also made based on the battery SOC or the engine water temperature.

When the temperature of the second clutch CL2 becomes predetermined value Tm1 or more in the WSC creep mode, it is necessary to reduce the load applied to the second clutch CL2. In this case, transition from the WSC creep mode to the CL2 overheat state mode is conducted. Specifically, the transition from the WSC creep mode to the CL2 overheat state mode is performed by reducing the coupling capacity of the first clutch CL1 while keeping the coupling capacity of the second clutch CL2. As a result, the temperature rise in the second clutch CL2 can be suppressed. When the temperature of the second clutch CL2 is decreased below a predetermined value Tm1 in the CL2 overheat state mode, transition to the WSC creep mode is conducted.

Next, transition from the CL2 overheat state mode is described. When the temperature of the second clutch CL2 becomes greater than or equal to a predetermined value Tm2 (the overheat limit value) in the CL2 overheat state mode, it is necessary to prevent the second clutch CL2 from being further heated. In this case, transition from the CL2 overheat state mode to the CL2 overheat limit mode is conducted. Specifically, the transition from the CL2 overheat state mode to the CL2 overheat limit mode is performed by reducing the coupling capacity of the first clutch CL1 so as to cause slippage in the first clutch CL1 and by completely engaging the second clutch CL2. The temperature rise in the second clutch CL2 can be suppressed by completely engaging the second clutch CL2. When the temperature of the second clutch CL2 is decreased below the predetermined value Tm2 in the CL2 overheat limit mode, transition to the CL2 overheat state mode is conducted.

Transition from the CL2 overheat limit mode is now described. When the temperature of the first clutch CL1 becomes greater than or equal to the predetermined value Tm2 in the CL2 overheat limit mode, it is necessary to suppress further heat generation in the first clutch CL1 caused due to the slippage. Therefore, complete engagement or disengagement of the first clutch CL1 must be selected. At this time, when the battery SOC is kept at a certain suitable level, transition from the CL2 overheat limit mode to the CL1, CL2 overheat limit mode is conducted. Specifically, the transition from the CL2 overheat limit mode to the CL1, CL2 overheat limit mode is performed by disengaging the first clutch CL1 and allowing the motor-generator MG to generate a driving force. When the temperature of the first clutch CL1 is decreased in the CL1, CL2 overheat limit mode, transition to the CL2 overheat limit mode is conducted.

When the temperature of the first clutch CL1 becomes greater than or equal to the predetermined value Tm2 in the CL2 overheat limit mode, it is necessary to suppress further heat generation in the first clutch CL1 caused due to the slippage. Therefore, complete engagement or disengagement of the first clutch CL1 must be selected. At this time, when the battery SOC is low transition from the CL2 overheat limit mode to the HEV mode is conducted. Specifically, the transition from the CL2 overheat limit mode to the HEV mode is performed by completely engaging the first clutch CL1. By conducting the transition to the HEV mode and obtaining the driving force of the engine E, the driving force of the motor-generator MG can be lowered or reduced to 0. As a result, even when the battery SOC is low, the hybrid vehicle can be kept driving. When the temperature of the first clutch CL1 is decreased in the HEV mode, transition to the CL2 overheat limit mode is conducted.

Transition from the CL1, CL2 overheat limit mode is next discussed. When the temperature of the first clutch CL1 is greater than the predetermined value Tm2, that is the overheat limit value and the battery SOC is lowered in the CL1, CL2 overheat limit mode, transition from the CL1, CL2 overheat limit mode to the HEV mode is conducted. Specifically, the transition from the CL1, CL2 overheat limit mode to the HEV mode is performed by completely engaging the first clutch CL1. Since the engine E is kept in operation in the CL1, CL2 overheat limit mode, it is unnecessary to perform the engine start control and the like and control the second clutch CL2 to the slip-engaged state. Accordingly, heat generation in the second clutch CL2 can be suppressed.

When the temperature of the first clutch CL1 is decreased below predetermined value Tm2, and the battery SOC is lowered in the CL1, CL2 overheat limit mode, transition from the CL1, CL2 overheat limit mode to the CL2 overheat limit mode is conducted. Specifically, the transition from the CL1, CL2 overheat limit mode to the CL2 overheat limit mode is performed by controlling the first clutch CL1 to the slip-engaged state and decreasing the driving force of the motor-generator MG (or reducing the driving force of the motor-generator MG to 0). As a result, the hybrid vehicle can be driven using the driving force of the engine E. Even when the battery SOC is low, the hybrid vehicle can be kept driving.

The apparatus and method for controlling a hybrid vehicle according to the above-explained first embodiment can attain the following functions and effects.

The amount of slippage in the first clutch CL1 and the amount of slippage in the second clutch CL2 are controlled depending on the temperature of the first clutch CL1 sensed by temperature sensor 10a and the temperature of the second clutch CL2 sensed by temperature sensor 1ob. Accordingly, it is possible to prevent one of the clutches from being overloaded and thereby overheated. As a result, durability of the clutch and variety of drive modes can be enhanced.

In other words, the amount of slippage in the first clutch CL1 and the amount of slippage in the second clutch CL2 are controlled, respectively, so as to suppress the temperature rise in only one of the first clutch CL1 and the second clutch CL2.

When the temperature of the second clutch CL2 is greater than or equal to the predetermined value Tm2, the second clutch CL2 is completely engaged, and the first clutch CL1 is slip-controlled so as to set a value of the coupling capacity of the first clutch CL1 corresponding to creep torque. As a result, the second clutch CL2 can be prevented from being overheated, and the creep drive of the hybrid vehicle can be maintained using the engine E.

When the rotating speed of the driving wheels is smaller than a value corresponding the idle speed of the engine E, namely, when the vehicle speed is smaller than value VSP1 in creep drive, the WSC mode is conducted. As a result, stable creep drive can be realized irrespective of idle speed of the engine E.

When the temperatures of first and second clutches CL1 and CL2 are greater than or equal to the predetermined value Tm2 and the battery SOC is a predetermined value or more, the first clutch CL1 is disengaged and the second clutch CL2 is completely engaged so that the vehicle driving is controlled by the motor-generator MG only while keeping the engine E in the operating state.

By disengaging the first clutch CL1, heat generation in the first clutch CL1 due to slippage does not occur. Therefore, the first clutch CL1 can be prevented from being further overheated. Further, since the engine E is kept in operation, the vehicle driving using the engine E can be performed by controlling only the coupling capacity of the first clutch CL1 without conducting the engine start control and the like, even in a case where the battery SOC is lowered. In addition, it is possible to avoid overheat that is caused due to slip control of the second clutch CL2 at the engine start-up, deterioration in response, the engine start shock and the like. Further, in a case where the first clutch CL1 is a hydraulic multiple disk clutch or the like, lubricating oil in the first clutch CL1 flows between the respective disk plates upon disengaging the first clutch CL1 so that cooling efficiency of the first clutch CL1 can be enhanced to thereby quickly decrease the temperature of the first clutch CL1.

When the temperatures of first and second clutches CL1 and CL2 are greater than or equal to the predetermined value Tm2 (the overheat limit value), and the battery SOC is below a predetermined value, first and second clutches CL1 and CL2 are completely engaged and transition to the HEV mode using both the driving force of the engine E and the driving force of the motor-generator MG is conducted. As a result, the driving force of the motor-generator MG can be decreased by using the driving force of the engine E. Even when the battery SOC is lowered, the vehicle driving can be maintained.

When the battery SOC is below the predetermined value in the WSC creep mode in which the first clutch CL1 is completely engaged and the second clutch CL2 is slip-engaged and the hybrid vehicle is driven using the driving forces of the engine E and the motor-generator MG, transition from the WSC creep mode to the WSC positive power generation mode in which the motor-generator MG is allowed to generate power and the hybrid vehicle is driven using the driving force of the engine E is conducted.

When the hybrid vehicle is driven using both of the driving forces of the engine E and the motor-generator MG in the WSC creep mode, the battery SOC is decreased due to power consumption by the motor-generator MG. In this case, the driving force of the engine E is increased and the motor-generator MG is allowed to generate power, while keeping the coupling capacity of the second clutch CL2. As a result, it is possible to recover the battery SOC while keeping the driving condition. Further, transition from the WSC creep mode to the EV creep mode can be readily performed by quickly recovering the battery SOC. This serves for enhancing the durability of the second clutch CL2.

When the battery SOC is greater than or equal to the predetermined value in the WSC creep mode in which the first clutch CL1 is completely engaged and the second clutch CL2 is slip-engaged and the hybrid vehicle is traveled using the driving forces of the engine E and the motor-generator MG, transition from the WSC creep mode to the EV mode in which the first clutch CL1 is disengaged and the second clutch CL2 is completely engaged and the hybrid vehicle is traveled using only the driving force of the motor-generator MG is conducted. As a result, the second clutch CL2 can be free from slippage and can be prevented from being further overheated.

It will be understood that the construction of the friction drive device of the invention is not limited to the first embodiment shown and described above, but that various changes and modifications may be made without departing from the scope or sprit of this invention. For example, in the first embodiment, when the temperature of the second clutch CL2 is increased the second clutch CL2 is completely engaged and the first clutch CL1 is controlled so as to increase the amount of slippage. After that, when the temperature of the first clutch CL1 is increased, the first clutch CL1 is disengaged or completely engaged. However, if the temperature of the first clutch CL1 is increased prior to the temperature rise in the second clutch CL2, the first clutch CL1 can be completely engaged and the second clutch CL2 controlled so as to increase the amount of slippage.

That is, when a required torque is transmitted to the driving wheels by using the first clutch CL1 and the second clutch CL2, the amounts of slippage in the first and second clutches CL1 and CL2 are suitably controlled so as to avoid the temperature rise in only one of first and second clutches CL1 and CL2, and both of the engine E and the motor-generator MG are operated to achieve the vehicle driving. At this time, the motor-generator MG is operated to generate both the driving force and the power.

Specifically, when the temperature of the first clutch CL1 is high, the amount of slippage in the first clutch CL1 is controlled to decrease. When the temperature of the second clutch CL2 is high, the amount of slippage in the first clutch CL1 is controlled such that the amount of slippage in the second clutch CL2 is reduced. This control may be achieved by a combination of operating or stopping the engine E and operating the motor-generator MG to generate the driving force or the electric power.

Further, in the case where both the engine E and the motor-generator MC are operated as described above, the purpose of operating the engine E is not limited to simply obtaining the driving force and may be, for instance, operating to increase the engine water temperature to thereby enhance the combustion efficiency, to generate the electric power or both of generating the electric power and obtaining the driving force.

Further, when the temperature of the second clutch CL2 is increased and the second clutch CL2 is completely engaged, creep drive of the hybrid vehicle can be achieved by controlling at least one of the driving forces of the engine E, the driving force of the motor-generator MG and the amount of slippage in the first clutch CL1. Namely, creep torque that can attain the creep drive when the second clutch CL2 is completely engaged means torque that is exerted on the input side of the second clutch CL2. In this case, the engine E serves as the driving source, the motor-generator MG serves as the driving source or braking source (power generation), and the first clutch CL1 serves as an element that determines what amount of the torque of the engine E which is inputted. The torque that is exerted on the input side of the second clutch CL2 can be controlled by suitably controlling the engine E, the motor-generator MG and the first clutch CL1. Even when the temperature of the second clutch CL2 is increased, stable creep drive of the hybrid vehicle can be realized.

The present invention is not limited to the first embodiment in which a clutch built in the automatic transmission is used as the second clutch. The second clutch can be additionally provided between the motor-generator and the transmission. Otherwise, the second clutch can be additionally provided between the transmission and the driving wheels (for example, see Japanese Provisional Publication No. 2002-144921). Further, the present invention can be applied to a hybrid vehicle having only the first clutch (the engine clutch) or can be applied to a hybrid vehicle that can attain a hybrid drive mode and an electric drive mode without employing the first clutch and the second clutch. This is because the motor can control rotating speed and torque independently even if having influence on efficiency.

Briefly speaking, the invention can be applied to a hybrid vehicle that includes an the engine and a motor as power sources and has a motor-using drive mode in which the power source includes the motor only, and an the engine-using drive mode in which the power source includes the engine.

Accordingly, the above-described embodiments have been described in order to allow easy understanding of the invention and do not limit the invention. On the contrary, the invention is intended to cover various modifications and equivalent arrangements included within the scope of the appended claims, which scope is to be accorded the broadest interpretation so as to encompass all such modifications and equivalent structure as is permitted under the law.

What is claimed is:

1. An apparatus for controlling a hybrid vehicle, the apparatus comprising:
    an engine;
    a motor-generator;
    a first coupling element disposed between the engine and the motor-generator to connect and disconnect a power transmission route between the engine and the motor-generator;
    a second coupling element disposed between the motor-generator and driving wheels of the hybrid vehicle to connect and disconnect a power transmission route between the motor-generator and the driving wheels;
    a sensor device operable to sensing a temperature of at least one of the first coupling element and the second coupling element; and
    a controller configured to control an amount of slippage in at least one of the first coupling element and the second coupling element depending on the temperature by reducing the amount of slippage in one of the first and second coupling elements when a measured temperature of the one of the first and second coupling elements is equal to or greater than a first predetermined value.

2. The apparatus according to claim 1 wherein the controller is further configured to, when the measured temperature of the one of the first and second coupling elements is greater than or equal to a second predetermined value, the second predetermined value being larger than the first predetermined value:

control the amount of slippage in the one of the first and second coupling elements so as to establish a completely coupled state of the one of the first and second coupling elements; and control the amount of slippage in the other of the first and second coupling elements so as to equalize a coupling capacity of the other of the first and second coupling elements with a required driving force.

3. The apparatus according to claim 2 wherein the one of the first and second coupling elements is the second coupling element and the other of the first and second coupling elements is the first coupling element.

4. The apparatus according to claim 1 wherein the one of the first and second coupling elements is the second coupling element.

5. The apparatus according to claim 4 wherein the controller is further configured to:

conduct the control operation when a speed of the driving wheels is lower than a speed corresponding to an idle speed of the engine.

6. The apparatus according to claim 1, further comprising:

a battery that supplies electric power to the motor-generator; and a battery state of charge detector that detects an amount of charge stored in the battery; and wherein the controller is further configured to, when measured temperatures of each of the first and second coupling elements are equal to or greater than a second predetermined value and the amount of charge stored in the battery is equal to or greater than a predetermined value:

disengage the first coupling element;

completely engage the second coupling element; and control driving of the hybrid vehicle only by the driving force of the motor-generator while maintaining the engine in an operated state.

7. The apparatus according to claim 6 wherein the controller is further configured to:

completely engage the first and second coupling elements and control driving of the hybrid vehicle by using both a driving force of the engine and a driving force of the motor-generator when the measured temperatures are equal to or greater than the second predetermined value and the amount of charge stored in the battery is less than the predetermined value.

8. The apparatus according to claim 1, further comprising:

a battery that supplies electric power to the motor-generator; and a battery state of charge detector that detects an amount of charge stored in the battery; and wherein the controller is further configured to:

conduct transition to a travel mode in which the motor-generator is allowed to generate electric power and the hybrid vehicle is driven by a driving force of the engine when the amount of charge stored in the battery is less than a predetermined value and when a travel mode in which the first coupling element is completely engaged, the second coupling element is kept in a slip-engaged state and the hybrid vehicle is driven by the driving force of the engine and a driving force of the motor-generator is selected.

9. The apparatus according to claim 1, further comprising:

a battery that supplies electric power to the motor-generator; and a battery state of charge detector that detects an amount of charge stored in the battery; and wherein the controller is further configured to:

conduct transition to a travel mode in which the first coupling element is disengaged, the second coupling element is completely engaged and the hybrid vehicle is driven only by a driving force of the motor-generator when the amount of charge stored in the battery equal to or greater than a predetermined value and when a travel mode in which the first coupling element is completely engaged, the second coupling element is kept in a slip-engaged state and the hybrid vehicle is driven by a driving force of the engine and the driving force of the motor-generator is selected.

10. The apparatus according to claim 1, wherein the controller is further configured to:

control the amount of slippage in the first coupling element and the amount of slippage in the second coupling element so as to suppress temperature rise in only one of the first coupling element and the second coupling element.

11. An apparatus for controlling a hybrid vehicle including an engine, a motor-generator, first coupling means for connecting and disconnecting a power transmission route between the engine and the motor-generator and second coupling means for connecting and disconnecting a power transmission route between the motor-generator and a driving wheel, the apparatus comprising:

means for sensing a temperature of at least one of the first coupling means and the second coupling means; and means for controlling an amount of slippage in at least one of the first and the second coupling means depending on the temperature including means for reducing the amount of slippage in one of the first and second coupling elements when a measured temperature of the one of the first and second coupling elements is equal to or greater than a first predetermined value.

12. A method for controlling a hybrid vehicle having an engine, a motor-generator, a first coupling element disposed between the engine and the motor-generator and a second coupling element disposed between the motor-generator and a driving wheel, the method comprising:

controlling an amount of slippage in at least one of the first coupling element and the second coupling element depending on a temperature of at least one of the first coupling element and the second coupling element by reducing the amount of slippage in one of the first and second coupling elements when a measured temperature of the one of the first and second coupling elements is equal to or greater than a first predetermined value.

13. The method according to claim 12 further comprising:

controlling the amount of slippage in the one of the first and second coupling elements so as to establish a completely coupled state of the one of the first and second coupling elements when the measured temperature of the one of the first and second coupling elements is greater than or equal to a second predetermined value, the second predetermined value being larger than the first predetermined value; and controlling the amount of slippage in the other of the first and second coupling elements so as to equalize a coupling capacity of the other of the first and second coupling elements with a required driving force when the measured temperature of the one of the first and second coupling elements is greater than or equal to the second predetermined value.

14. The method according to claim 12, further comprising:

performing the controlling when a speed of the driving wheels is lower than a speed corresponding to an idle speed of the engine.

15. The method according to claim 12, further comprising:
supplying electric power to the motor-generator with a battery;
detecting an amount of charged stored in the battery; and, when measured temperatures of each of the first and second coupling elements are equal to or greater than a second predetermined value and the amount of charge stored in the battery is equal to or greater than a predetermined value,
disengaging the first coupling element;
completely engaging the second coupling element; and
controlling driving of the hybrid vehicle only by the driving force of the motor-generator while maintaining the engine in an operated state.

16. The apparatus according to claim 15, further comprising:
completely engaging the first and second coupling elements and controlling driving of the hybrid vehicle by using both a driving force of the engine and a driving force of the motor-generator when the measured temperatures are equal to or greater than the second predetermined value and the amount of charge stored in the battery is less than the predetermined value.

17. The method according to claim 12, further comprising:
supplying electric power to the motor-generator with a battery;
detecting an amount of charged stored in the battery; and
transitioning to a travel mode in which the motor-generator is allowed to generate electric power and the hybrid vehicle is driven by a driving force of the engine when the amount of charge stored in the battery is less than a predetermined value and when a travel mode in which the first coupling element is completely engaged, the second coupling element is kept in a slip-engaged state and the hybrid vehicle is driven by a driving force of the engine and a driving force of the motor-generator is selected.

18. The method according to claim 12, further comprising:
supplying electric power to the motor-generator with a battery;
detecting an amount of charged stored in the battery; and
transitioning to a travel mode in which the first coupling element is disengaged, the second coupling element is completely engaged and the hybrid vehicle is driven only by a driving force of the motor-generator when the amount of charge stored in the battery equal to or greater than a predetermined value and when a travel mode in which the first coupling element is completely engaged, the second coupling element is kept in a slip-engaged state and the hybrid vehicle is driven by a driving force of the engine and the driving force of the motor-generator is selected.

19. The method according to claim 12, further comprising:
controlling the amount of slippage in the first coupling element and the amount of slippage in the second coupling element to suppress temperature rise in only one of the first coupling element and the second coupling element.

* * * * *